United States Patent
Matsuzaki et al.

[11] Patent Number: 5,958,850
[45] Date of Patent: Sep. 28, 1999

[54] RUST PREVENTIVE COMPOSITION

[75] Inventors: Yukio Matsuzaki; Yoshihiro Iwamura; Yoshitaka Natsume, all of Yokohama, Japan

[73] Assignee: Nippon Oil., Ltd., Tokyo, Japan

[21] Appl. No.: 08/835,901

[22] Filed: Apr. 10, 1997

[30] Foreign Application Priority Data

Apr. 12, 1996 [JP] Japan .................................. 8-115594

[51] Int. Cl.$^6$ .............................. C09K 3/00; C04B 9/02
[52] U.S. Cl. .................... 508/435; 252/389.23; 252/388; 252/396; 106/14.12; 106/14.13; 106/14.27; 106/14.41; 508/564; 508/441
[58] Field of Search ............................. 252/389.23, 388, 252/396; 106/14.12, 14.13, 14.27, 14.41; 508/435, 564, 441

[56] References Cited

U.S. PATENT DOCUMENTS

| | | | |
|---|---|---|---|
| 3,341,467 | 9/1967 | Hwa | 252/321 |
| 4,465,516 | 8/1984 | Danner et al. | 106/14.12 |
| 4,613,445 | 9/1986 | Haack et al. | 252/33.2 |
| 4,900,459 | 2/1990 | Ohmori et al. | 252/32.5 |
| 5,104,558 | 4/1992 | Matsuzaki | 252/75 |
| 5,380,466 | 1/1995 | Martin | 252/389.22 |

FOREIGN PATENT DOCUMENTS

| | | |
|---|---|---|
| 0108536 | 5/1984 | European Pat. Off. . |
| 2069459 | 9/1971 | France . |
| 4-314795 | 11/1992 | Japan . |
| 1562759 | 3/1980 | United Kingdom . |

*Primary Examiner*—C. H. Kelly
*Assistant Examiner*—Monique T. Cole
*Attorney, Agent, or Firm*—Kubovcik & Kubovcik

[57] ABSTRACT

A rust preventive composition which is obtained by blending at least one base oil selected from the group consisting of a hydrocarbon solvent, a mineral oil and a synthetic oil with, as essential components, (A) an organophosphoric ester calcium salt represented by the following general formula (1) in an amount of 0.1 to 5.0% by mass based on the total mass of the composition

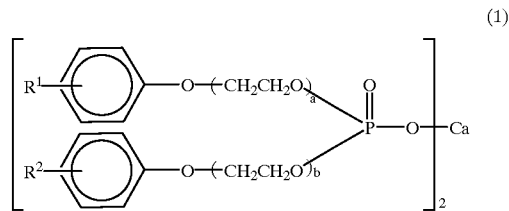

wherein $R^1$ and $R^2$ are each an alkyl group having 6 to 18 carbon atoms; and a and b are each an integer of 1 to 6, (B) water in an amount of 0.1 to 3.0 parts by weight based on 1 part by weight of the component (A), and (C) a rust inhibitor in an amount of 2.0 to 30% by mass based on the total mass of the composition.

5 Claims, No Drawings

RUST PREVENTIVE COMPOSITION

BACKGROUND OF THE INVENTION

1. Field of the Invention

This invention relates to a rust preventive composition, and more specifically, it relates to a rust preventive composition which can form a stable rust prevention film to achieve an excellent rustproof performance.

2. Prior Art

A rust preventative has usually been manufactured by blending a film-forming agent such as a wax with various rust prevention additives using a hydrocarbon solvent, a mineral oil, a synthetic oil, water or the like as a medium. The rust preventative is used to coat the surfaces of steel materials or steel products thereby to prevent rust from being generated on the surfaces.

Rust inhibitors have heretofore been systematically researched and developed to provide excellent ones. However, materials which have been used as the film-forming agents necessary to enable rust preventatives to exert therein practical performances stably under widely varied environments and various usages, include wax, petrolatum, a paraffin oxide, a lanolin fatty acid derivative and a calcium carbonate dispersion.

However, these film-forming agents do not have sufficient solubility in a hydrocarbon solvent, mineral oil or synthetic oil which is each an organic medium, and, therefore, they have defects that they separate part of their components therefrom and are difficultly adjustable in film thickness for most suitable use. In consequence, the film-forming agents will raise problems that rust preventatives prepared using the agents have insufficient rust-preventative and degreasing capabilities whereby said rust preventatives are limited in use although their use is the most economical in rust preventative effects.

SUMMARY OF THE INVENTION

The present inventors have intensively investigated a wide variety of organic materials with an intention of solving the above-mentioned problems, and as a result, it has been surprisingly found that when much attention is paid to an organic phosphoric ester calcium salt having a specific structure which has heretofore been considered to be a water-soluble compound and this organic phosphoric ester calcium salt is used together with a specific amount of water, there can be obtained a film-forming agent each for use in a rust preventative having a high solubility in an organic medium such as a hydrocarbon solvent, a mineral oil or a synthetic oil and having an excellent film formation performance. On the basis of this finding, this invention has been completed.

The film-forming agent used in this invention can exert the excellent film formation performance when a specific amount of the film-forming agent is dissolved in the organic mediums, and when the film-forming agent is used together with various rust inhibitors, a rust preventive composition which can withstand various rust generation circumstances can be provided.

Furthermore, the rust prevention performance of the rust preventive composition can be further improved by selecting compounds having specific structures as the rust inhibitor.

This invention is directed to a rust preventive composition which is obtained by blending at least one base oil selected from the group consisting of a hydrocarbon solvent, a mineral oil and a synthetic oil with, as essential components, (A) an organophosphoric ester calcium salt represented by the following general formula (1) in an amount of 0.1 to 5.0% by mass based on the total mass of the composition

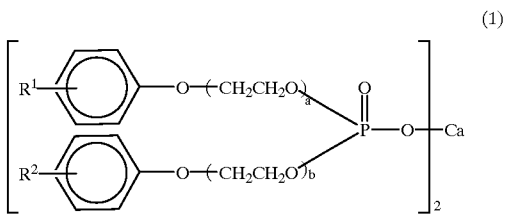

wherein $R^1$ and $R^2$ are each an alkyl group having 6 to 18 carbon atoms; and a and b are each an integer of 1 to 6, (B) water in an amount of 0.1 to 3.0 parts by weight per 1 part by weight of the component (A), and (C) a rust inhibitor in an amount of 2.0 to 30% by mass based on the total mass of the composition.

PREFERRED EMBODIMENTS OF THE INVENTION

The rust preventative composition of this invention contains one or more base oils selected from the group consisting of a hydrocarbon solvent, a mineral oil and a synthetic oil.

No particular restriction is put on the above-mentioned hydrocarbon solvent, and there can be used mineral oil-based and/or synthetic hydrocarbon-based solvents which have been used as a usual hydrocarbon solvent.

Typical examples of the mineral oil-based hydrocarbon solvent are paraffinic, naphthenic, aromatic solvent fractions and mixtures thereof, which can be prepared by subjecting a crude oil to atmospheric distillation or vacuum distillation to obtain solvent fractions, and then refining the thus obtained solvent fractions by a suitable combination of purification treatments such as hydrorefining, sulfuric acid washing and clay treatment.

Further, examples of the synthetic hydrocarbon solvent are paraffinic, naphthenic, aromatic and olefinic synthetic-hydrocarbon solvents.

Here, typical examples of the paraffinic synthetic hydrocarbon solvents are so-called synthetic isoparaffins, which can be prepared by polymerizing an olefin such as propylene, butene or isobutylene singly or a mixture thereof to obtain a low-molecular weight oligomer, and then hydrogenating double bonds contained in the oligomer.

Furthermore, typical examples of the naphthenic synthetic hydrocarbon solvents are so-called synthetic naphthenes, which can be prepared by dimerizing α-methylstyrene or alkylating benzene, toluene or xylene with styrene to obtain a diarylalkane, and then further hydrogenating the nuclei of the diarylalkane.

Furthermore, typical examples of the aromatic synthetic hydrocarbon solvents are a hard type alkylbenzene obtained by alkylating benzene with a propylene oligomer, and a soft type alkylbenzene prepared by alkylating benzene with a normal olefin obtained by dehydrogenating a normal paraffin separated from kerosine, or with a chlorinated paraffin obtained by chlorinating the normal paraffin.

Furthermore, typical examples of the olefinic synthetic hydrocarbon solvents are low-molecular weight oligomers prepared by polymerizing olefins singly, such as ethylene, propylene, butene and isobutene or a mixture thereof.

These synthetic hydrocarbon solvents may be used singly or in a combination of two or more thereof. Moreover, a mixed solvent obtained by mixing the synthetic hydrocarbon solvent and the mineral oil-based hydrocarbon solvent in an optional ratio can also be used.

In addition, the other characteristics of the hydrocarbon solvent can be optionally selected, but from the viewpoint of preventing the ignition danger of the rust preventive composition, the upper limit of a vapor pressure of the hydrocarbon solvent at 25° C. is preferably $2.0 \times 10^{-2}$ MPa, more preferably $5.0 \times 10^{-3}$ MPa. On the other hand, the lower limit of the vapor pressure of the hydrocarbon solvent at 25° C. is not restricted at all, but if much attention is paid to the dryness of a coating film formed by the coating of the rust preventive composition, the lower limit of the vapor pressure of the hydrocarbon solvent at 25° C. is preferably $5.0 \times 10^{-6}$ MPa, more preferably $1.0 \times 10^{-4}$ MPa.

No particular restriction is put on kinds of mineral oil and synthetic oil referred to herein, and usually, there can be used the mineral oil and the synthetic oil which have been used as the base oil of the rust preventive composition.

Examples of the usable mineral oil are paraffinic and naphthenic oils, which can be prepared by distilling a crude oil under atmospheric pressure and reduced pressure to obtain a lubricant fraction, and then purifying the lubricant fraction through a suitable combination of solvent deasphalting, solvent extraction, hydrogenolysis, solvent dewaxing, catalytic dewaxing, hydrogenating purification, sulfuric acid washing, clay treatment and the like. Furthermore, examples of the usable synthetic oil are poly-α-olefins (polybutene, 1-octene oligomer, 1-decene oligomer and the like), alkylbenzenes, alkylnaphthalenes, diesters (ditridecyl glutarates, di-2-ethylhexyl adipate, diisodecyl adipate, ditridecyl adipate, di-2-ethylhexyl sebacate and the like), polyol esters (trimethylolpropane caprylate, trimethylolpropane pelargonate, pentaerythritol-2-ethyl hexanoate, pentaerythritol pelargonate and the like), polyoxyalkylene glycols and polyphenyl ethers.

These mineral oil and synthetic oil may be used singly or in a combination of two or more thereof.

Furthermore, the other characteristics of the mineral oil and the synthetic oil can be optionally selected, but from the viewpoint of operations such as the coating and the removal of the rust preventive composition, the upper limit of a kinematic viscosity at 40° C. is preferably 500 mm$^2$/s, more preferably 150 mm$^2$/s, most preferably 80 mm$^2$/s. On the other hand, the lower limit of the kinematic viscosity at 40° C. is not restricted at all, but if much attention is paid to the maintenance of the film thickness and the flammability of the rust preventive composition, the lower limit of the kinematic viscosity at 40° C. is preferably 0.7 mm$^2$/s, more preferably 2.0 mm$^2$/s.

A component (A) in the rust preventive composition of this invention is an organic phosphoric ester calcium salt represented by the following general formula (1)

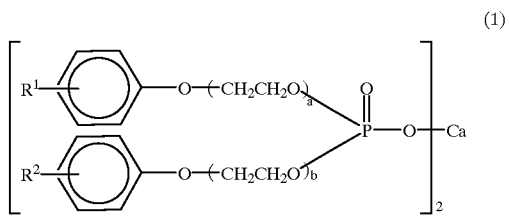

In the general formula (1), $R^1$ and $R^2$ are each an alkyl group having 6 to 18 carbon atoms, but the lower limit of the carbon number of this alkyl group is 6, preferably 8, and on the other hand, the upper limit of the carbon number of this alkyl group is 18, preferably 15. If the carbon number of this alkyl group of $R^1$ and/or $R^2$ in the general formula (1) is less than 6 or more than 18, the film formation performance of the rust preventive composition noticeably deteriorates inconveniently.

The alkyl group having 6 to 18 carbon atoms referred to herein may be straight-chain or branched, and typical examples of the alkyl group are straight-chain and branched hexyl groups, straight-chain and branched heptyl groups, straight-chain and branched octyl groups, straight-chain and branched nonyl groups, straight-chain and branched decyl groups, straight-chain and branched undecyl groups, straight-chain and branched dodecyl groups, straight-chain and branched tridecyl groups, straight-chain and branched tetradecyl groups, straight-chain and branched pentadecyl groups, straight-chain and branched hexadecyl groups, straight-chain and branched heptadecyl groups, and straight-chain and branched octadecyl groups.

Above all, preferably, $R^1$ and $R^2$ are each a straight-chain or a branched alkyl group having 8 to 15 carbon atoms, and more preferably, it is a branched alkyl group having 8 to 15 carbon atoms.

The positions at which a benzene ring is substituted by $R^1$ and $R^2$ in the general formula (1) are optional, but from the viewpoint of the easiness of synthesis and availability, para-positions to a (poly)oxyethylene group are preferable.

In the general formula (1), a and b are each an integer of 1 to 6, preferably 1 to 4, more preferably 1 to 3. In the general formula (1), when a and/or b is in excess of 6, the solubility of the rust preventive composition to the base oil is noticeably poor.

As the component (A) in the rust preventive composition of this invention, for example, a compound which is on sale under the trade name "CRODAX DP-301" made by Croda Japan Co., Ltd. can be preferably used.

A component (B) in the rust preventive composition of this invention is water. Water may be hard water or soft water, and therefore, not only tap water and industrial water but also purified waters such as ion-exchanged water and distilled water can be used.

A component (C) in the rust preventive composition of this invention is a rust inhibitor.

As the rust inhibitor, there can be used an optional rust inhibitor which has been used in a usual rust preventative.

The rust inhibitor referred to herein is usually an organic compound having, in its molecule, a polar group such as a carboxyl group (—COOH), a carbonate ion, a sulfonate ion, an ester group, an alcoholic hydroxyl group, an amino group, in imino group, a phosphorous hydroxyl group, a phosphoric hydroxyl group, a phosphate ion or a phosphate ion.

Typical examples of the rust inhibitor which can be used as the component (C) in the rust preventative composition of this invention are carboxylic acids such as monocarboxylic acids typified by stearic acid and coconut oil fatty acid, dicarboxylic acids typified by alkylsuccinic and alkenylsuccinic acids (inclusive of anhydrides) and their derivatives, carboxylic acids having other polar groups typified by hydroxy-fatty acids, mercapto fatty acids and sarcosine derivatives, and oxidized waxes;

- carboxylates typified by metallic salts (Ca salts, Ba salts, Mg salts, Al salts, Zn salts and Pb salts) and amine salts (monoamine salts, beef tallow amine salts, polyamine salts and alkanolamine salts) of carboxylic acids such as fatty acids, naphthenic acid, resin acids, lanolin fatty acids, alkenylsuccinic acids, amino acid derivatives and oxidized waxes;
- metallic salts (Na salts, Ca salts, Ba salts and Zn salts) and amine salts (monoamine salts, polyamine salts, rosinamine salts, alkanolamine salts and morpholine salts) of sulfonic acids such as petroleum sulfonic acid, dinonylnaphthalene sulfonic acid and heavy alkylbenzenesulfonic acids;
- esters typified by esters (inclusive of partial esters) of polyhydric alcohols such as glycerin, pentaerythritol, sorbitol and sucrose, and carboxylic acids such as lauric acid and oleic acid;
- alcohols typified by higher aliphatic alcohols and ethylene oxide adducts of alkylphenols;
- amines typified by dicyclohexylamine, morpholine and alkanolamines;
- phosphorous and phosphoric acid derivatives typified by phosphoric acid monoesters, phosphoric acid diesters, phosphorous acid esters and their amine salts; and
- boron compounds.
- However, in the rust preventive composition regarding this invention, it is preferable to use one or more rust inhibitors selected from the following paragraphs (a) to (d), because the employment of such rust inhibitors permits the preparation of the composition having a more excellent rust prevention performance:
- (a) a lanolin fatty acid ester,
- (b) a partial ester of one or more polyhydric alcohols selected from the group consisting of glycerin, trimethylolethane, trimethylolpropane, pentaerythritol and sorbitol, and a fatty acid having 10 to 22 carbon atoms,
- (c) an alkali metal salt, an alkaline earth metal salt or an amine salt of sulfonic acid, and
- (d) a metallic salt of an oxidized wax.

The above-mentioned component (a) is the lanolin fatty acid ester.

This lanolin fatty acid ester can be prepared by reacting lanolin (wool fat) obtained by purifying a waxy substance attached to wool with a polyhydric alcohol such as glycerin, trimethylolethane, trimethylolpropane, pentaerythritol or sorbitan to esterify a part or all of fatty acid components contained in the lanolin.

A saponification value and a total acid value of the component (a) are optional.

However, the component (a) in which the saponification value in conformity with JIS K 2503 is preferably in the range of 10 to 300 mgKOH/g, more preferably 50 to 220 mgKOH/g is used, because the employment of this kind of component (a) permits the preparation of the composition which is excellent in storage stability, anti-oxidizing stability, water substitution properties and rust prevention properties.

For the same reason, the component (a) in which the total acid value prescribed in JIS(Japanese Industrial Standard) K 2501 is preferably in the range of 0.5 to 30 mgKOH/g, more preferably 2 to 10 mgKOH/g is used.

Furthermore, the above-mentioned component (b) is a partial ester of one or more polyhydric alcohols selected from the group consisting of glycerin, trimethylolethane, trimethylolpropane, pentaerythritol and sorbitol, and a fatty acid having 10 to 22 carbon atoms.

The partial ester referred to herein means an ester in which at least one of the hydroxyl groups in the polyhydric alcohol is not esterified and it still remains in the form of the hydroxyl group.

The above-mentioned fatty acid may be a saturated fatty acid or an unsaturated fatty acid, or it may be a straight-chain fatty acid or a branched fatty acid.

Typical examples of the fatty acid are saturated fatty acids such as straight-chain and branched decanoic acids, straight-chain and branched undecanoic acids, straight-chain and branched dodecanoic acids, straight-chain and branched tridecanoic acids, straight-chain and branched tetradecanoic acids, straight-chain and branched pentadecanoic acids, straight-chain and branched hexadecanoic acids, straight-chain and branched heptadecanoic acids, straight-chain and branched octadecanoic acids, straight-chain and branched nonadecanoic acids, straight-chain and branched icosanoic acids, straight-chain and branched henicosanoic acids, and straight-chain and branched docosanoic acids (inclusive of all isomers);

unsaturated fatty acids such as straight-chain and branched decenoic acids, straight-chain and branched undecenoic acids, straight-chain and branched dodecenoic acids, straight-chain and branched tridecenoic acids, straight-chain and branched tetradecenoic acids, straight-chain and branched pentadecenoic acids, straight-chain and branched hexadecenoic acids, straight-chain and branched heptadecenoic acids, straight-chain and branched octadecenoic acids, straight-chain and branched nonadecenoic acids, straight-chain and branched icosenoic acids, straight-chain and branched henicosenoic acids, and straight-chain and branched docosenoic acids (inclusive of all isomers); and mixtures thereof.

Typical examples of the component (b) are partial esters of glycerin such as glycerin monododecanoate (glycerin monolaurate), glycerin monoisolaurate, glycerin didodecanoate (glycerin dilaurate), glycerin diisolaurate, glycerin monotetradodecanoate (glycerin monomyristate), glycerin monoisomyristate, glycerin ditetradecanoate (glycerin dimyristate), glycerin diisomyristate, glycerin monohexadecanoate (glycerin monopalmitate), glycerin monoisopalmitate, glycerin dihexadecanoate (glycerin dipalmitate), glycerin diisopalmitate, glycerin monooctadecanoate (glycerin monostearate), glycerin monoisostearate, glycerin dioctadecanoate (glycerin distearate), glycerin diisostearate, glycerin monooctadecenoate (glycerin monooleate), glycerin monoisooleate, glycerin dioctadecenoate (glycerin dioleate) and glycerin diisooleate;

partial esters of trimethylolethane such as trimethylolethane monododecanoate (trimethylolethane monolaurate), trimethylolethane monoisolaurate, trimethylolethane didodecanoate (trimethylolethane dilaurate), trimethylolethane diisolaurate, trimethylolethane monotetradecanoate (trimethylolethane myristate), trimethylolethane monoisomyristate, trimethylolethane ditetradecanoate (trimethylolethane dimyristate), trimethylolethane diisomyristate, trimethylolethane monohexadecanoate (trimethylolethane monopalmitate), trimethylolethane monoisopalmitate, trimethylolethane dihexadecanoate (trimethylolethane dipalmitate), trimethylolethane diisopalmitate, trimethylolethane monooctadecanoate (trimethylolethane monostearate), trimethylolethane monoisostearate, trimethylolethane dioctadecanoate (trimethylolethane distearate), trimethylolethane diisostearate, trimethylolethane monooctadecenoate (trimethylolethane monooleate), trimethylolethane monoisooleate, trimethylolethane dioctadecenoate (trimethylolethane dioleate) and trimethylolethane diisooleate;

partial esters of trimethylolpropane such as trimethylolpropane monododecanoate (trimethylolpropane monolaurate), trimethylolpropane monoisolaurate, trimethylolpropane didodecanoate (trimethylolpropane dilaurate), trimethylolpropane diisolaurate, trimethylolpropane monotetradecanoate (trimethylolpropane monomyristate), trimethylolpropane monoisomyristate, trimethylolpropane ditetradecanoate (trimethylolpropane dimyristate), trimethylolpropane diisomyristate, trimethylolpropane monohexadecanoate (trimethylolpropane monopalmitate), trimethylolpropane monoisopalmitate, trimethylolpropane dihexadecanoate (trimethylolpropane dipalmitate), trimethylolpropane diisopalmitate, trimethylolpropane monooctadecanoate (trimethylolpropane monostearate), trimethylolpropane monoisostearate, trimethylolpropane dioctadecanoate (trimethylolpropane distearate), trimethylolpropane diisostearate, trimethylolpropane monooctadecenoate (trimethylolpropane monooleate), trimethylolpropane monoisooleate, trimethylolpropane dioctadecenoate (trimethylolpropane dioleate) and trimethylolpropane diisooleate;

partial esters of pentaerythritol such as pentaerythritol monododecanoate (pentaerythritol monolaurate), pentaerythritol monoisolaurate, pentaerythritol didodecanoate (pentaerythritol dilaurate), pentaerythritol diisolaurate, pentaerythritol tridodecanoate (pentaerythritol trilaurate), pentaerythritol triisolaurate, pentaerythritol monotetradecanoate (pentaerythritol monomyristate), pentaerythritol monoisomyristate, pentaerythritol ditetradecanoate (pentaerythritol dimyristate), pentaerythritol diisomyristate, pentaerythritol tritetradecanoate (pentaerythritol trimyristate), pentaerythritol triisomyristate, pentaerythritol monohexadecanoate (pentaerythritol monopalmitate), pentaerythritol monoisopalmitate, pentaerythritol dihexadecanoate (pentaerythritol dipalmitate), pentaerythritol diisopalmitate, pentaerythritol trihexadecanoate (pentaerythritol tripalmitate), pentaerythritol triisopalmitate, pentaerythritol monooctadecanoate (pentaerythritol monostearate), pentaerythritol monoisostearate, pentaerythritol dioctadecanoate (pentaerythritol distearate), pentaerythritol diisostearate, pentaerythritol trioctadecanoate (pentaerythritol tristearate), pentaerythritol triisostearate, pentaerythritol monooctadecenoate (pentaerythritol monooleate), pentaerythritol monoisooleate, pentaerythritol dioctadecenoate (pentaerythritol dioleate), pentaerythritol diisooleate, pentaerythritol trioctadecenoate (pentaerythritol trioleate) and pentaerythritol triisooleate;

partial esters of sorbitan such as sorbitan monododecanoate (sorbitan monolaurate), sorbitan monoisolaurate, sorbitan didodecanoate (sorbitan dilaurate), sorbitan diisolaurate, sorbitan tridodecanoate (sorbitan trilaurate), sorbitan triisolaurate, sorbitan monotetradecanoate (sorbitan monomyristate), sorbitan monoisomyristate, sorbitan ditetradecanoate (sorbitan dimyristate), sorbitan diisomyristate, sorbitan tritetradecanoate (sorbitan trimyristate), sorbitan triisomyristate, sorbitan monohexadecanoate (sorbitan monopalmitate), sorbitan monoisopalmitate, sorbitan dihexadecanoate (sorbitan dipalmitate), sorbitan diisopalmitate, sorbitan trihexadecanoate (sorbitan tripalmitate), sorbitan triisopalmitate, sorbitan monooctadecanoate (sorbitan monostearate), sorbitan monoisostearate, sorbitan dioctadecanoate (sorbitan distearate), sorbitan diisostearate, sorbitan trioctadecanoate (sorbitan tristearate), sorbitan triisostearate, sorbitan monooctadecenoate (sorbitan monooleate), sorbitan monoisooleate, sorbitan dioctadecenoate (sorbitan dioleate), sorbitan diisooleate, sorbitan trioctadecenoate (sorbitan trioleate) and sorbitan triisooleate; and mixtures thereof. They can be preferably used as the component (b), and monoesters are particularly preferable.

Typical examples of the monoesters are glycerin monododecanoate (glycerin monolaurate), glycerin monoisolaurate, glycerin monotetradecanoate (glycerin monomyristate), glycerin monoisomyristate, glycerin monohexadecanoate (glycerin monopalmitate), glycerin monoisopalmitate, glycerin monooctadecanoate (glycerin monostearate), glycerin monoisostearate, glycerin monooctadecenoate (glycerin monooleate), glycerin monoisooleate;

trimethylolethane monododecanoate (trimethylolethane monolaurate), trimethylolethane monoisolaurate, trimethylolethane monotetradecanoate (trimethylolethane myristate), trimethylolethane monoisomyristate, trimethylolethane monohexadecanoate (trimethylolethane monopalmitate), trimethylolethane monoisopalmitate, trimethylolethane monooctadecanoate (trimethylolethane monostearate), trimethylolethane monoisostearate, trimethylolethane monooctadecenoate (trimethylolethane monooleate), trimethylolethane monoisooleate;

trimethylolpropane monododecanoate (trimethylolpropane monolaurate), trimethylolpropane monoisolaurate, trimethylolpropane monotetradecanoate (trimethylolpropane monomyristate), trimethylolpropane monoisomyristate, trimethylolpropane monohexadecanoate (trimethylolpropane monopalmitate), trimethylolpropane monoisopalmitate, trimethylolpropane monooctadecanoate (trimethylolpropane monostearate), trimethylolpropane monoisostearate, trimethylolpropane monooctadecenoate (trimethylolpropane monooleate), trimethylolpropane monoisooleate;

pentaerythritol monododecanoate (pentaerythritol monolaurate), pentaerythritol monoisolaurate, pentaerythritol monotetradecanoate (pentaerythritol monomyristate), pentaerythritol monoisomyristate, pentaerythritol monohexadecanoate (pentaerythritol monopalmitate), pentaerythritol monoisopalmitate, pentaerythritol monooctadecanoate (pentaerythritol monostearate), pentaerythritol monoisostearate, pentaerythritol monooctadecenoate (pentaerythritol monooleate), pentaerythritol monoisooleate;

sorbitan monododecanoate (sorbitan monolaurate), sorbitan monoisolaurate, sorbitan monotetradecanoate (sorbitan monomyristate), sorbitan monoisomyristate, sorbitan monohexadecanoate (sorbitan monopalmitate), sorbitan monoisopalmitate, sorbitan monooctadecanoate (sorbitan monostearate), sorbitan monoisostearate, sorbitan monooctadecenoate (sorbitan monooleate), sorbitan monoisooleate; and mixtures thereof. They can be preferably used as the component (b).

The above-mentioned component (c) is an alkali metal salt, an alkaline earth metal salt or an amine salt of sulfonic acid.

Typical examples of the alkali metal are sodium and potassium, and typical examples of the alkaline earth metal are magnesium, calcium and barium. Furthermore, typical examples of the amine are ammonia; alkylamines having an alkyl group of 1 to 3 carbon atoms such as, monomethylamine, dimethylamine, trimethylamine, monoethylamine, diethylamine, triethylamine, monopropylamine, dipropylamine and tripropylamine; and alkanolamines having an alkanol group of 1 to 3 carbon atoms such as monomethanolamine, dimethanolamine, trimethanolamine, monoethanolamine, diethanolamine, triethanolamine, monopropanolamine, dipropanolamine and tripropanolamine.

No particular restriction is put on a preparation method of the component (c), and the component (c) prepared by an optional method can be used. Concretely, for example, there can be used the alkali metal salt, the alkaline earth metal salt or the amine salt of an alkylaromatic sulfonic acid obtained by sulfonating an alkylaromatic compound having a molecular weight of 100 to 1500, preferably 200 to 700, or a mixture of these salts can also be used.

Examples of the alkylaromatic sulfonic acid referred to herein usually are petroleum sulfonic acids such as so-called mahogany acid secondarily produced at the same time of the manufacture of white oil and a sulfonic acid obtained by sulfonating an alkylaromatic compound in a lubricant oil fraction of a mineral oil; synthetic sulfonic acids which include a sulfonic acid obtained by sulfonating an alkylbenzene having a straight-chain or a branched alkyl group and by sulfonating an alkylnaphthalene such as dinonylnaphthalene; and the like.

The alkylbenzene having a straight-chain or a branched alkyl group includes one secondarily produced from a plant for manufacturing an alkylbenzene which has been used as a raw material of detergents and one obtained by alkylating a polyolefin to benzene.

As this component (c), there can be used a neutral sulfonate (a normal salt) and a basic sulfonate obtained by directly reacting the above-mentioned alkylaromatic sulfonic acid with an alkali metal base (an oxide or a hydroxide of an alkali metal and the like), an alkaline earth metal base (an oxide or a hydroxide of an alkaline earth metal and the like) or the above-mentioned amine (ammonia, an alkylamine, an alkanolamine or the like); a carbonate overbased sulfonate obtained by further reacting the neutral sulfonate (a normal salt) with an excessive amount of an alkali metal base or an alkaline earth metal base in the presence of a carbon dioxide gas; and a borate overbased sulfonate obtained by reacting the neutral sulfonate (a normal salt) with an alkali metal base or an alkaline earth metal base and a boric acid compound such as boric acid or boric anhydride.

A total base value of the component (c) in accordance with a perchloric acid method in conformity with JIS K 2501 is optional, but it is preferable to use the sulfonate having a base value in the range of 0 to 500 mgKOH/g, more preferably 0 to 400 mgKOH/g.

Furthermore, the above-mentioned component (d) is a metallic salt of an oxidized wax.

This metallic salt of the oxidized wax is a metallic salt which can be prepared by oxidizing a wax such as a paraffin wax, a microcrystalline wax or petrolatum obtained at the same time of the purification of a petroleum fraction, or a polyolefin wax obtained by synthesis to form an oxidized wax, and then reacting the oxidized wax with a salt or a base of an alkali metal such as sodium or potassium, or an alkaline earth metal such as magnesium, calcium or barium to neutralize a part or all of an acidic group which the oxidized wax has. As the metallic salt of the oxidized wax in this invention, the barium salt of the oxidized wax is preferably used, and the barium salt of the oxidized paraffin is more preferably used.

A saponification value and a total acid value of the component (d) are optional.

However, the component (d) in which the saponification value in conformity with JIS K 2503 is preferably in the range of 10 to 180 mgKOH/g, more preferably 50 to 100 mgKOH/g is used, because the employment of this kind of component (d) permits the preparation of the composition which is excellent in shelf stability, anti-oxidizing stability, water substitution properties and rust prevention properties.

For the same reason, the component (d) in which the total acid value in conformity with JIS K 2501 is preferably in the range of 0.5 to 50 mgKOH/g, more preferably 2 to 20 mgKOH/g is used.

Furthermore, for the same reason, the component (d) in which a metal content is preferably in the range of 0.5 to 10% by mass, more preferably 1.0 to 5.0% by mass is used.

Needless to say, as the component (C), there can also preferably be used a mixture obtained by mixing, in an optional ratio, two or more compounds selected from the group consisting of the components (a), (b), (c) and (d).

Furthermore, in the rust preventive composition according to this invention, it is particularly preferable to use one or more compounds selected from the above-mentioned components (a) and (b) as the essential component (C), because the employment of the selected one or more components permits the preparation of the rust preventive composition which is excellent in rust prevention performance.

More preferably, if the rust preventive composition according to this invention comprises at least one compound selected from said component (c) in combination with at least one compound selected from said component(s) (a) and/or (b), the rust preventive composition of this invention is excellent in rust prevention performance.

The rust preventive composition of this invention can be obtained by blending the base oil with the components (A), (B) and (C) as the essential components, but it is important that the contents of the respective components meet the following relations.

That is to say, the lower limit of the content of the component (A) is required to be 0.1% by mass, preferably 0.3% by mass based on the total mass of the rust preventive composition, and on the other hand, the upper limit of the content of the component (A) is required to be 5.0% by mass, preferably 3.0% by mass based on the total mass of the rust preventive composition. If the content of the component (A) is less than 0.1% by mass based on the total mass of the rust preventive composition, it is difficult to obtain a sufficient film thickness, and on the other hand, if it is more than 5.0% by mass, the rust preventive composition is liable to gel. Neither case is preferable.

Furthermore, the lower limit of the content of the component (B) is required to be 0.1 part by weight, preferably 0.3 parts by weight per 1 part by weight of the component (A), and on the other hand, the upper limit of the content of the component (B) is required to be 3.0 parts by weight, preferably 1.0 part by weight per 1 part by weight of the component (A). If the content of the component (B) is less than 0.1 part by weight per 1 part by weight of the component (A), a film-forming agent having a high solubility to the base oil cannot be obtained, and on the other hand, if it is more than 3.0 parts by weight, the rust prevention performance of the rust preventive composition is very poor. Neither case is preferable.

In addition, the lower limit of the content of the component (C) is required to be 2.0% by mass, preferably 5.0% by mass based on the total mass of the rust preventive composition, and on the other hand, the upper limit of the content of the component (C) is required to be 30% by mass, preferably 20% by mass based on the total mass of the rust preventive composition. If the content of the component (C) is less than 2% by mass based on the total mass of the rust preventive composition, the rust prevention performance of the rust preventive composition is very poor, and on the other hand, if it is more than 30% by mass, the improvement effect of the rust prevention performance corresponding to the high content cannot be obtained. Neither case is preferable.

In this invention, as described above, the rust preventive composition having the excellent rust prevention performance can be obtained by blending the base oil with the predetermined amounts of the components (A), (B) and (C), but for the purpose of further heightening some performances, known additives which have usually been used in a rust preventative can be used singly or in a combination of two or more thereof.

Typical examples of these additives are
lubricity improvers typified by a phosphoric acid ester such as tricresyl phosphate, a fat such as lard, and fatty acids;
antioxidants typified by 2,6-di-tert-butyl-p-cresol, 4,4'-methylenebis(2,6-di-tert-butylphenol), 4,4'-bis(2,6-di-tert-butylphenol) and 4,4'-thiobis(6-tert-butyl-o-cresol);
a wetting agent such as diethylene glycol monoalkyl ether;
film-forming agents such as polyacrylate, polymethacrylate, polybutene, paraffin wax, microwax, slack wax and polyolefin wax;
water displacing agents such as amine salts of fatty acids;
extreme pressure agents such as zinc dialkyldithiophosphates, sulfated oils and fats, and phosphorus compounds;
solid lubricants such as graphite, fluorinated graphite, molybdenum disulfide, boron nitride and polyethylene powder;
corrosion inhibitors such as amines, alkanolamines, amides and carboxylic acids;
metal inactivators such as benzotriazole and thiazole; and
antifoaming agents such as methyl silicone, fluorosilicone and polyacrylate.

When these known additives are used together, the contents of them are optional, but in general, the total content of these known additives is preferably such as to be in the range of 0.1 to 10% by mass based on the total mass of the rust preventive composition.

The rust preventive composition of this invention is excellent in rust prevention preformance for various metals such as iron, zinc, aluminum and alloys of these metals and other metals, and it can be effectively applied to positions where the rust prevention properties of the metal are required.

Next, this invention will be described in more detail with reference to examples and comparative examples, but the scope of this invention should not be limited to them.

EXAMPLES 1 TO 8 AND COMPARATIVE EXAMPLES 1 to 7

The rust preventive compositions of this invention were prepared in accordance with compositions shown in Table 1 (Examples 1 to 8).

For comparison, there were prepared a composition in which a component (A) was not contained (Comparative Example 1), a composition in which a component (B) was not contained (Comparative Example 2), a composition in which a component (C) was not contained (Comparative Example 3), a composition in which the content of the component (A) was higher than that of the component (A) of Examples (Comparative Example 4), and compositions in which a base oil was blended with the component (C) and film-forming agents other than the film-forming agents regarding this invention (Comparative Examples 5 to 7).

In this connection, the components used herein are as follows:
Base oil
A: Purified paraffinic light mineral oil (kinematic viscosity at 40° C.=6.5 mm$^2$/s)
B: Alkylbenzene (kinematic viscosity at 40° C.=7.2 mm$^2$/s)
Component (A)

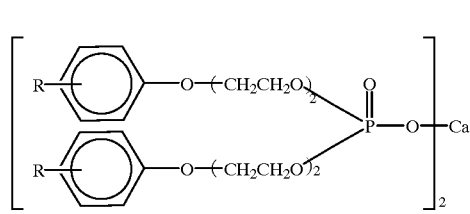

(2)

R: A branched dodecyl group derived from a tetramer of propylene.

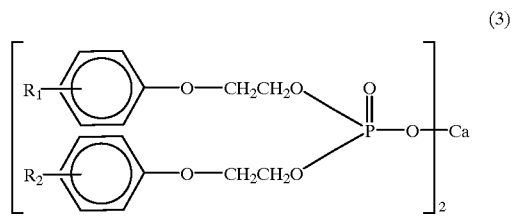

(3)

$R_1$: A branched octyl group derived from a dimer of isobutylene.
$R_2$: A branched pentadecyl group derived from a pentamer of propylene.
Component (B)
Purified water
Component (C)
E: Lanolin fatty acid trimethylolpropane ester (saponification value=170 mgKOH/g, total acid value=15 mgKOH/g)
F: Sorbitan monooleate
G: Calcium carbonate overbased petroleum sulfonate [total base value (in conformity with a perchloric acid method)=300 mgKOH/g]
H: Ba salt of oxidized wax (saponification value=75 mgKOH/g, total acid value=12 mgKOH/g, Ba content=3.5% by mass)
Other Film-forming Agents
  I: Petrolatum (melting point=48° C.)
  J: Paraffin wax (melting point=54° C.)
  K: Polymethacrylate (weight-average molecular weight=118000)

For the compositions of Examples 1 to 8 and Comparative Examples 1 to 7, the following performances were evaluated, and the results are shown in Table 1.

Film Thickness Test

The thickness of a rust prevention film was calculated in accordance with "a film thickness test method" prescribed in 5.19 of JIS K 2246 "Rust Preventive Oil".

Salt Spray Test

The test was made in accordance with "a salt spray test method" prescribed in 5.35 of JIS K 2246 "Rust Preventive Oil", but instead of the measurement of a rust generation degree after a stipulated time, a retention time until the rust generation degree had become a class B was measured.

Working Property Test

Low-temperature Spraying Properties

The test was made in accordance with "a sprayability test method" prescribed in 5.27 of JIS K 2246 "Rust Preventive Oil", but in this case, a spraying temperature was changed to 0° C., and the continuity of a film formed by spraying was measured. Evaluation was made on the basis of the following classification:

○: A spray operation was carried out without any problem, and the film was continuous.

Δ: The spray operation was carried out without any problem, but the film was slightly discontinuous.

X: The spray operation was difficult.

Cleaning Property

A test piece B prescribed in 5.3.1 of JIS K 2246 "Rust Preventive Oil" was prepared by a method of 5.3.2, and this test piece B was then immersed in 500 ml of kerosine for washing. After the test piece B immersed in kerosine was swung for 1 minute, the test piece B was taken out and then measured to see whether or not a coating film on the surface of the test piece B still remains thereon. Evaluation was made on the basis of the following classification:

○: Any coating film did not remain.

Δ: A part of the coating film remained.

X: The coating film remained.

Storage Stability Test

Room Temperature 80 ml of a sample was placed in a 100 ml screw tube, and after a lid had been put on the screw tube, it was stored in a thermostatic chamber at 20° C. for 1 month. Then, for the sample which had been stored for 1 month, a viscosity change of a kinematic viscosity at 40° C. was measured, and a state of phase separation and precipitation was visually evaluated.

Low Temperature 80 ml of a sample was placed in a 100 ml screw tube, and after a lid had been put on the screw tube, it was stored in a thermostatic chamber at 0° C. for 10 days. Then, a state of phase separation and precipitation was visually evaluated at room temperature.

As shown by the results of the performance evaluation test in Table 1, the rust preventive compositions according to this invention have an excellent film-forming performance and rust prevention performance as compared with the compositions of the comparative examples. Simultaneously, the rust preventive compositions of this invention have a high solubility to an organic medium which is a base oil, and they are also excellent in coating workability and storage stability.

TABLE 1

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Composition [mass %] | | base oil | A [88.0] | B [88.0] | A [78.0] | B [88.0] | A [78.0] | A [78.0] | B [78.0] | B [78.0] |
| | | component (A) | C [1.0] | D [1.0] | C [1.0] | D [1.0] | C [1.0] | C [1.0] | C [1.0] | C [1.0] |
| | | component (B) | [1.0] | [1.0] | [1.0] | [1.0] | [1.0] | [1.0] | [1.0] | [1.0] |
| | | component (C) | E [10.0] | F [10.0] | G [20.0] | H [10.0] | E [7.0] G [10.0] H [3.0] | G [15.0] H [5.0] | E [7.0] G [10.0] H [3.0] | G [15.0] H [5.0] |
| | | other film-forming agents | — | — | — | — | — | — | — | — |
| Film thickness test g/m² | | | 5.3 | 5.0 | 7.0 | 5.5 | 6.0 | 7.5 | 8.0 | 9.0 |
| Salt spray test h | | | 72 | 72 | 48 | 48 | 120 | 96 | 72 | 48 |
| Working property test | Low-temp. spraying properties | | ○ | ○ | ○ | ○ | ○ | ○ | ○ | ○ |
| | cleaning property | | ○ | ○ | ○ | ○ | ○ | ○ | ○ | ○ |
| Storage stability test | Room temp. | Viscosity change (%) | +5 or less | +5 or less | +5 or less | +5 or less | +5 or less | +5 or less | +5 or less | +5 or less |
| | | Phase separation and precipitation | none | none | none | none | none | none | none | none |
| | Low temp. | Phase separation and precipitation | none | none | none | none | none | none | none | none |

TABLE 1-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Composition [mass %] | base oil | A [89.0] | A [89.0] | A [98.0] | A [81.0] | A [60.0] | A [85.0] | A [85.0] |
|  | component (A) | — | C [1.0] | C [1.0] | D [1.0] | — | — | — |
|  | component (B) | [1.0] | — | [1.0] | [3.0] | — | — | — |
|  | component (C) | E [10.0] | E [10.0] | — | E [10.0] | E [10.0] | E [10.0] | E [10.0] |
|  | other film-forming agents | — | — | — | — | I [30.0] | J [5.0] | K [5.0] |
| Film thickness test g/m² |  | 4.2 | 3.5 | 3.0 | 100 or above | 20.0 | 3.0 | 4.0 |
| Salt spray test h |  | 16 | 24 | 4 | 120 | 72 | 48 | 16 |
| Working property test | Low-temp. spraying properties | Δ | ○ | ○ | X | X | X | Δ |
|  | cleaning property | ○ | ○ | Δ | Δ | X | X | Δ |
| Storage stability test | Room temp. Viscosity change (%) | +5 or less | +5 or less | +5 or less | gelation | 100 or above | +5 or less | +5 or less |
|  | Phase separation and precipitation | occured | occured | none | | occured | none | none |
|  | Low temp. Phase separation and preciptation | occured | occured | occured |  | occured | occured | none |

What is claimed is:

1. A rust preventive composition which is obtained by blending at least one base oil selected from the group consisting of a hydrocarbon solvent, a mineral oil and a synthetic oil with, as essential components, (A) an organophosphoric ester calcium salt represented by the general formula (1) in an amount of 0.1 to 5.0% by mass based on the total mass of the composition

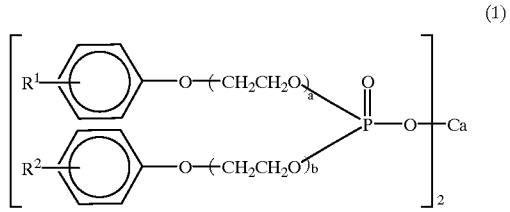

(1)

wherein $R^1$ and $R^2$ are individually an alkyl group having 6 to 18 carbon atoms; and a and b are each an integer of 1 to 6, (B) water in an amount of 0.1 to 3.0 parts by weight per 1 part by weight of the component (A), and (C) a rust inhibitor in an amount of 2.0 to 30% by mass based on the total mass of the composition.

2. A rust preventive composition according to claim 1, wherein said rust inhibitor is at least one member selected from the group consisting of (a) a lanolin fatty acid ester, (b) a partial ester of one or more polyhydric alcohols selected from the group consisting of glycerin, trimethylolethane, trimethylolpropane, pentaerythritol and sorbitol, with a fatty acid having 10 to 22 carbon atoms, (c) an alkali metal salt, an alkaline earth metal salt or an amine salt of sulfonic acid, and (d) a metallic salt of an oxidized wax.

3. A rust preventive composition according to claim 1, wherein said rust inhibitor is at least one member selected from the group consisting of:

(a) a lanolin fatty acid ester, and (b) a partial ester of at least one polyhydric alcohol selected from the group consisting of glycerin, trimethylolethane, trimethylolpropane, pentaerythritol and sorbitan, with a fatty acid having 10 to 22 carbon atoms.

4. A rust preventive composition according to claim 1, wherein said rust inhibitor is an organic compound having a polar group selected from the group consisting of a carboxyl group, a carbonate ion, a sulfonate ion, an ester group, an alcoholic hydroxyl group, an amino group, an imino group, a phosphorous hydroxyl group, a phosphoric hydroxyl group, a phosphite ion and a phosphate ion.

5. A rust preventive composition according to claim 1, wherein said rust inhibitor is at least one member selected from the group consisting of carboxylic acids, carboxylates, metallic salts and amine salts of sulfonic acids, esters, alcohols, amines, phosphorous and phosphoric acid monoesters, diesters, and their amine salts, and boron compounds.

* * * * *